(12) United States Patent
Choi et al.

(10) Patent No.: US 11,978,458 B2
(45) Date of Patent: May 7, 2024

(54) ELECTRONIC APPARATUS AND METHOD FOR RECOGNIZING SPEECH THEREOF

(71) Applicant: Samsung Electronics Co., Ltd., Suwon-si (KR)

(72) Inventors: Wonjong Choi, Suwon-si (KR); Soofeel Kim, Suwon-si (KR); Yewon Park, Suwon-si (KR); Jina Ham, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 343 days.

(21) Appl. No.: 17/290,873

(22) PCT Filed: Apr. 24, 2020

(86) PCT No.: PCT/KR2020/005430
§ 371 (c)(1),
(2) Date: May 3, 2021

(87) PCT Pub. No.: WO2021/010578
PCT Pub. Date: Jan. 21, 2021

(65) Prior Publication Data
US 2021/0327437 A1    Oct. 21, 2021

(30) Foreign Application Priority Data

Jul. 15, 2019    (KR) .................. 10-2019-0085163

(51) Int. Cl.
*G10L 17/24*    (2013.01)
*G10L 15/183*    (2013.01)
(Continued)

(52) U.S. Cl.
CPC ............ *G10L 17/24* (2013.01); *G10L 15/183* (2013.01); *G10L 15/22* (2013.01); *G10L 17/02* (2013.01)

(58) Field of Classification Search
USPC ................... 704/246, 247, 251, 252, 275
See application file for complete search history.

(56) References Cited

U.S. PATENT DOCUMENTS 7,310,690 B2    12/2007    Yokota
7,673,071 B2    3/2010    Baldwin et al.
(Continued)

FOREIGN PATENT DOCUMENTS

JP            4201869 B2      12/2008
KR    10-2014-0106715 A       9/2014
(Continued)

*Primary Examiner* — Leonard Saint-Cyr
(74) *Attorney, Agent, or Firm* — Jefferson IP Law, LLP

(57) ABSTRACT

An electronic apparatus is provided. The electronic apparatus according to an embodiment includes a communication interface, a memory configured to store identification information of a plurality of device, and a processor configured to, based on a user speech signal including a request related to a device being received, extract a first keyword related to a type of the device and a second keyword related to a characteristic of the device from the user speech signal, obtain specification information of the plurality of devices based on identification information of a plurality of devices corresponding to the first keyword stored in the memory, compare specification information of the plurality of devices and select a device corresponding to the second keyword, and perform an operation corresponding to the user speech signal using identification information of the selected device.

13 Claims, 7 Drawing Sheets

(51) Int. Cl.
    *G10L 15/22*    (2006.01)
    *G10L 17/02*    (2013.01)

(56) References Cited

U.S. PATENT DOCUMENTS

| | | |
|---|---|---|
| 9,842,584 B1 | 12/2017 | Hart et al. |
| 10,089,072 B2 | 10/2018 | Piersol et al. |
| 10,283,116 B2 | 5/2019 | Ko et al. |
| 10,489,111 B2 | 11/2019 | Jeong |
| 10,587,430 B1 * | 3/2020 | Smith ................ H04N 21/4825 |
| 2013/0238326 A1 | 9/2013 | Kim et al. |
| 2015/0088518 A1 | 3/2015 | Kim et al. |
| 2016/0200547 A1 * | 7/2016 | Nagata .................... B66B 1/468 |
| | | 187/380 |
| 2016/0380968 A1 | 12/2016 | Sarwar et al. |
| 2017/0070478 A1 | 3/2017 | Park et al. |
| 2017/0084274 A1 | 3/2017 | Kim et al. |
| 2017/0206896 A1 | 7/2017 | Ko et al. |
| 2017/0323646 A1 | 11/2017 | Kojima et al. |
| 2018/0247645 A1 | 8/2018 | Li et al. |
| 2018/0285065 A1 | 10/2018 | Jeong |
| 2018/0308477 A1 | 10/2018 | Nagasaka |
| 2019/0012141 A1 | 1/2019 | Piersol et al. |
| 2019/0096404 A1 * | 3/2019 | Lewis .................... G10L 15/08 |
| 2019/0115025 A1 | 4/2019 | Choi |
| 2019/0244602 A1 * | 8/2019 | Shyong ............... G06F 16/9017 |
| 2020/0005777 A1 * | 1/2020 | Wittke .................... G10L 15/22 |
| 2020/0057606 A1 | 2/2020 | Jeong |
| 2020/0057607 A1 | 2/2020 | Jeong |

FOREIGN PATENT DOCUMENTS

| | | |
|---|---|---|
| KR | 10-2017-0086814 A | 7/2017 |
| KR | 10-1925034 B1 | 12/2018 |

\* cited by examiner

[Fig. 1]
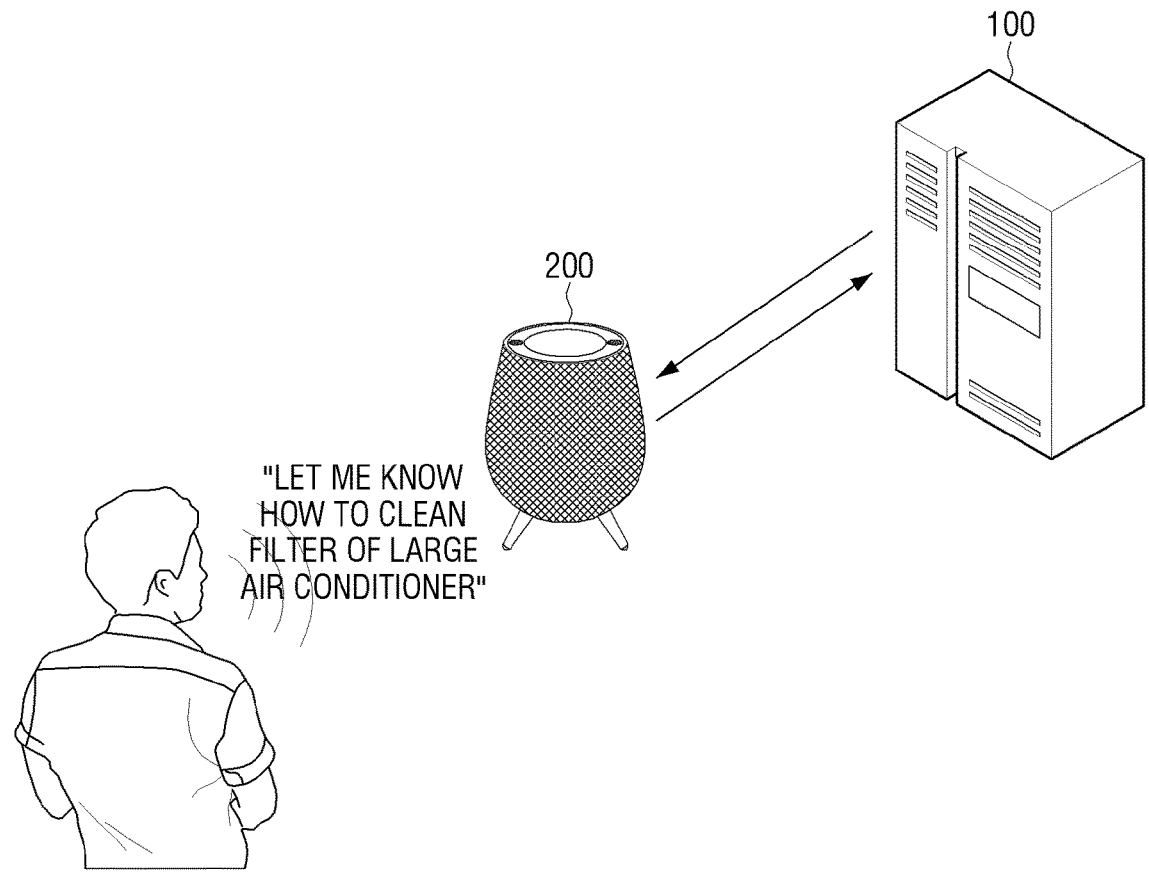
[Fig. 2]
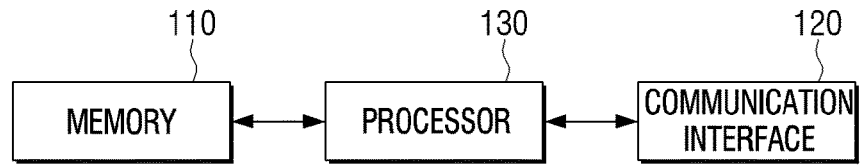
[Fig. 3]
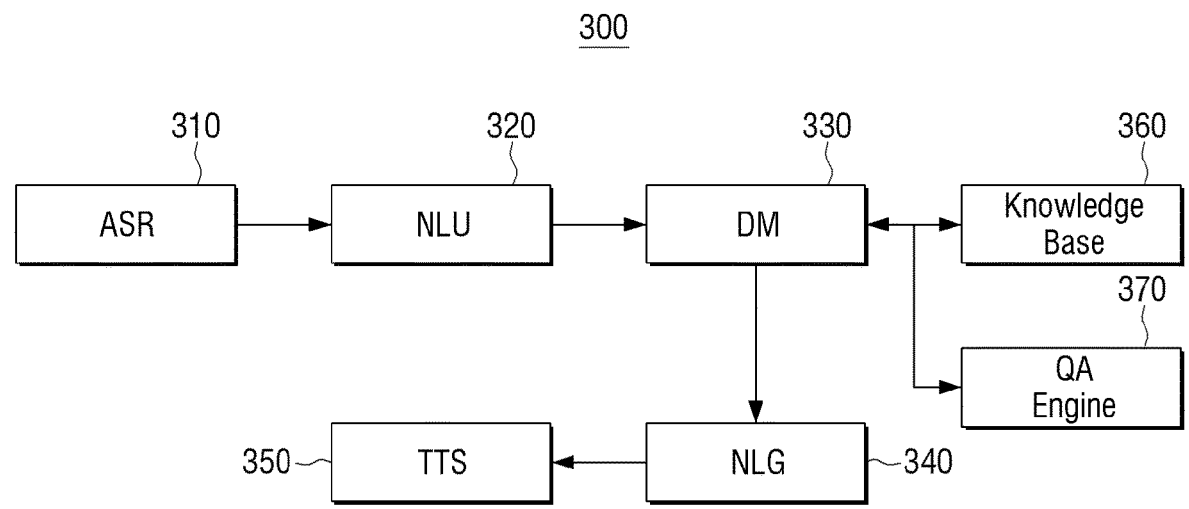

[Fig. 4]
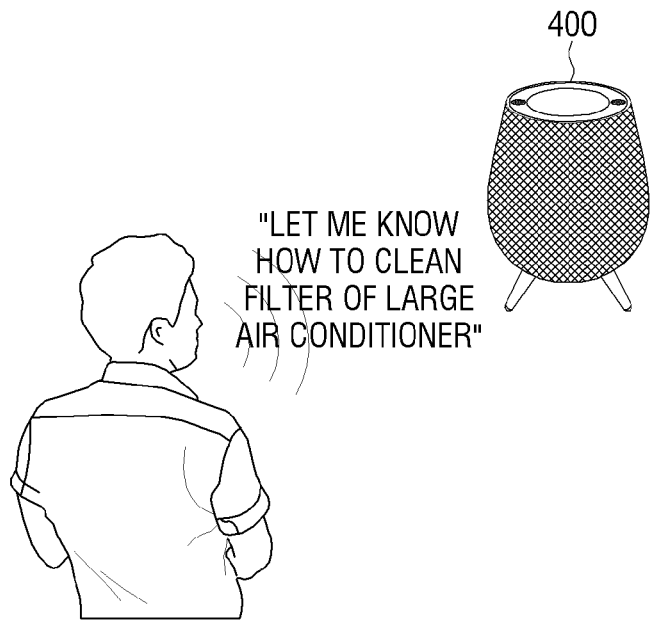
[Fig. 5]
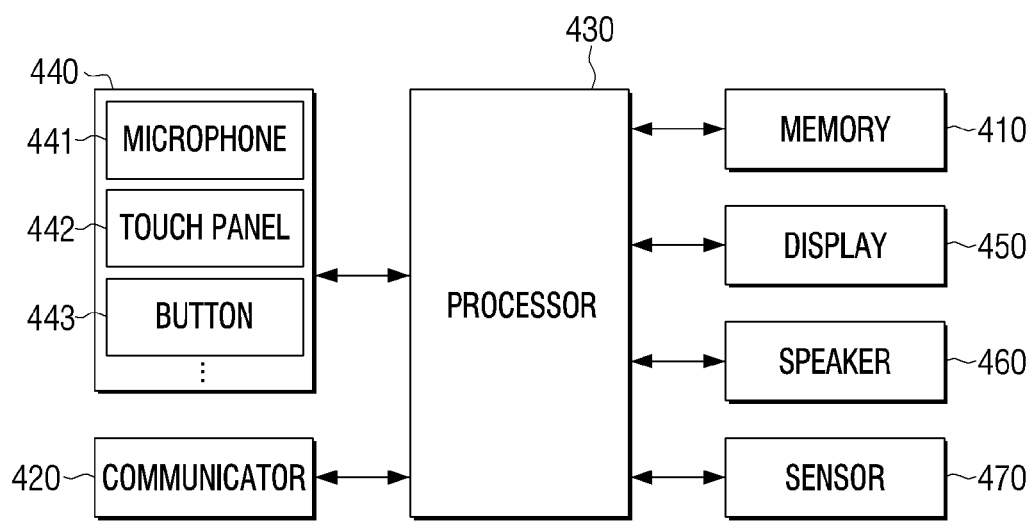

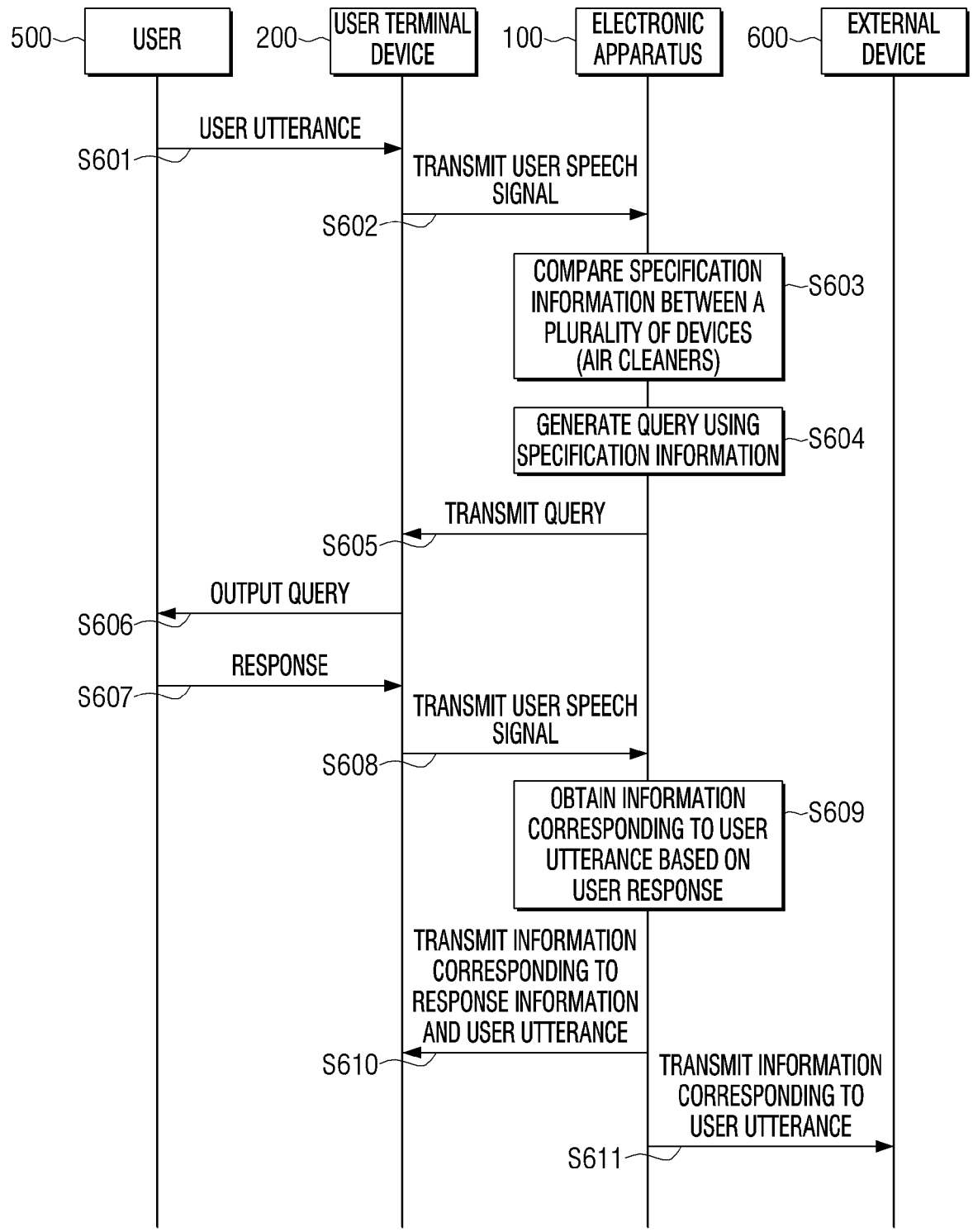

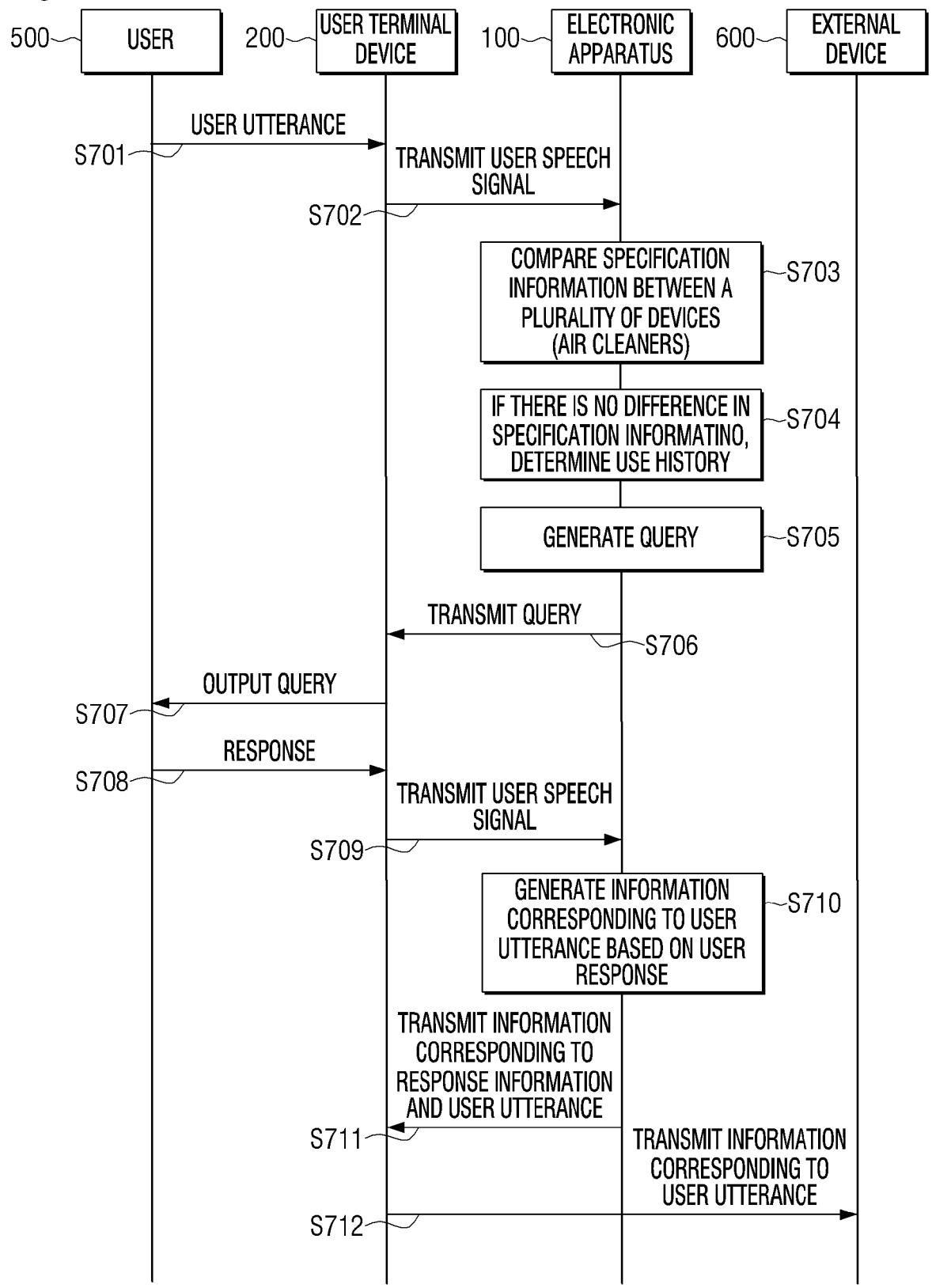
[Fig. 7]

[Fig. 8]
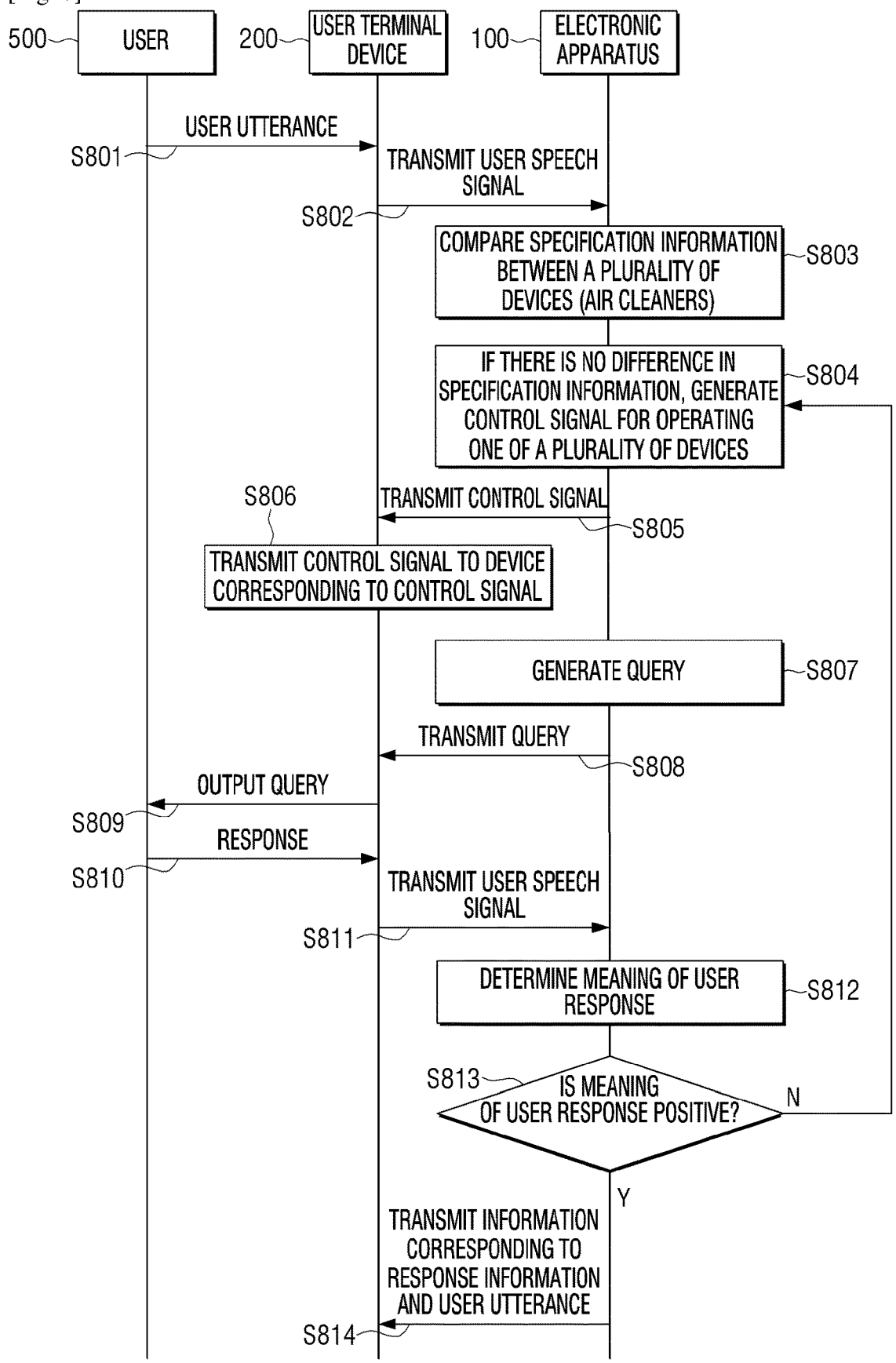

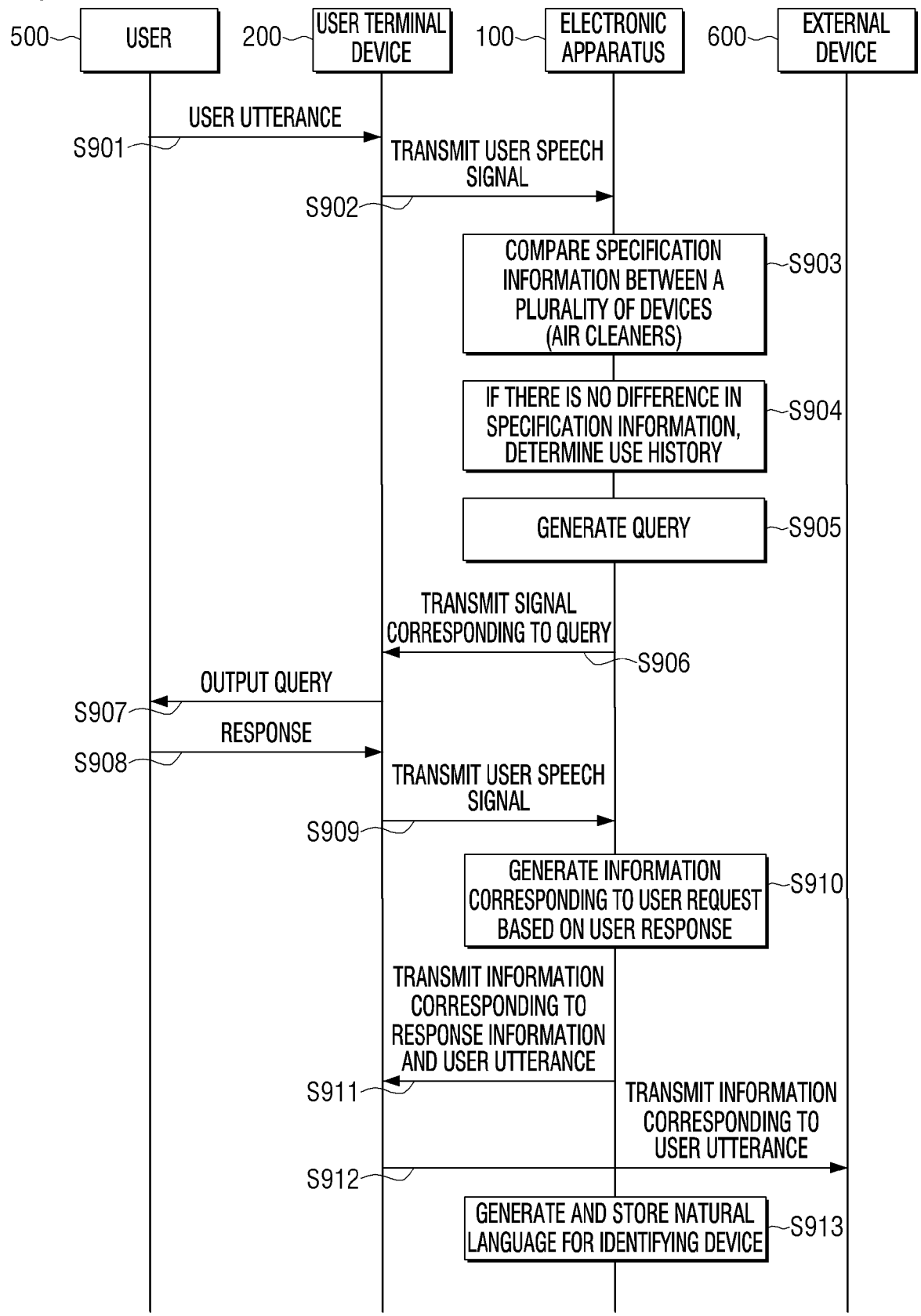

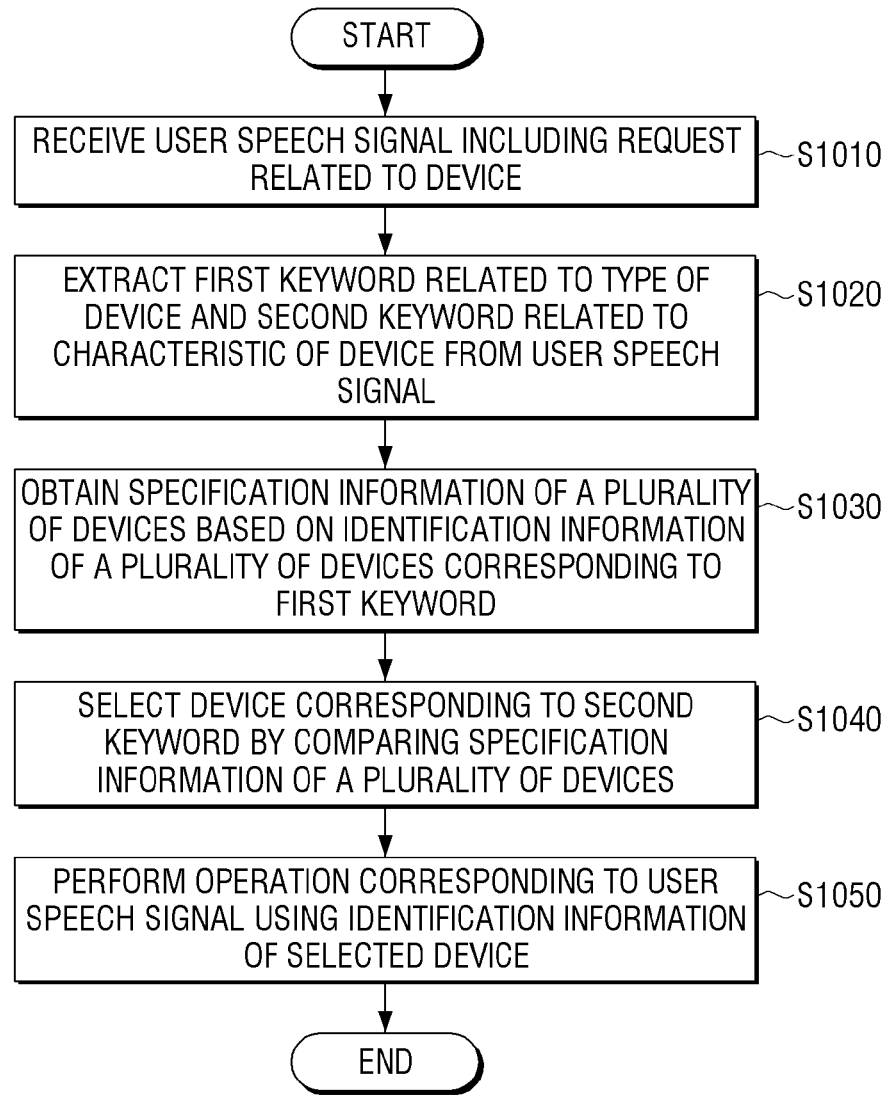

ELECTRONIC APPARATUS AND METHOD FOR RECOGNIZING SPEECH THEREOF

CROSS-REFERENCE TO RELATED APPLICATION(S)

This application is a U.S. National Stage application under 35 U.S.C. § 371 of an International application number PCT/KR2020/005430, filed on Apr. 24, 2020, which is based on and claims priority of a Korean patent application number 10-2019-0085163, filed on Jul. 15, 2019, in the Korean Intellectual Property Office, the disclosure of which is incorporated by reference herein in its entirety.

TECHNICAL FIELD

Aspects of the exemplary embodiments relate to an electronic apparatus and a method for recognizing a speech thereof and more particularly, to an electronic apparatus that receives a user speech and performs an operation corresponding to a user speech signal and a method for recognizing a speech thereof.

BACKGROUND ART

Recently, with the development of speech recognition technology, various services using Artificial Intelligence (AI) assistants (e.g., Bixby™, Assistant™ Alexa™, etc.) that provide answers to user speeches have been provided.

A user may request information on how to use various devices or how to solve non-failure problems through AI assistants. In addition, a user may input a command for controlling various devices through AI assistants.

DISCLOSURE OF INVENTION

Technical Problem

The present disclosure is to provide an electronic apparatus which identifies a device related to a user's request using identification information and specification information of the device, and performs an operation corresponding to a user speech signal using the identification information of the identified device and a method for recognizing a speech.

Solution to Problem

An electronic apparatus according to an embodiment includes a communication interface, a memory configured to store identification information of a plurality of devices, and a processor configured to, based on a user speech signal including a request related to a device being received, extract a first keyword related to a type of the device and a second keyword related to a characteristic of the device from the user speech signal, obtain specification information of the plurality of devices based on identification information of a plurality of devices corresponding to the first keyword stored in the memory, compare specification information of the plurality of devices and select a device corresponding to the second keyword, and perform an operation corresponding to the user speech signal using identification information of the selected device.

Meanwhile, a speech recognition method of an electronic apparatus according to an embodiment includes receiving a user speech signal including a request related to a device, extracting a first keyword related to a type of the device and a second keyword related to a characteristic of the device from the user speech signal, obtaining specification information of the plurality of devices based on identification information of a plurality of devices corresponding to the first keyword, comparing specification information of the plurality of devices and selecting a device corresponding to the second keyword, and performing an operation corresponding to the user speech signal using identification information of the selected device.

BRIEF DESCRIPTION OF DRAWINGS

FIG. 1 is a view provided to explain a speech recognition system providing a response to a user's query according to various embodiments;

FIG. 2 is a block diagram illustrating configuration of an electronic apparatus 100 according to an embodiment;

FIG. 3 is a block diagram illustrating a dialogue system of an electronic apparatus according to an embodiment;

FIG. 4 is a view provided to explain the electronic apparatus 100 according to another embodiment;

FIG. 5 is a block diagram illustrating configuration of the electronic apparatus 100 according to another embodiment;

FIG. 6 is a sequence view provided to explain an electronic apparatus according to various embodiments;

FIG. 7 is a sequence view provided to explain an electronic apparatus according to various embodiments;

FIG. 8 is a sequence view provided to explain an electronic apparatus according to various embodiments;

FIG. 9 is a sequence view provided to explain an electronic apparatus according to various embodiments; and FIG. 10 is a flowchart provided to explain a controlling method of an electronic apparatus according to an embodiment.

MODE FOR THE INVENTION

Hereinafter, various embodiments of the present disclosure will be described with reference to the accompanying drawings. However, it should be understood that the present disclosure is not limited to the specific embodiments described hereinafter, but includes various modifications, equivalents, and/or alternatives of the embodiments of the present disclosure. In relation to explanation of the drawings, similar drawing reference numerals may be used for similar constituent elements.

In the disclosure, an expression "have", "may have", "include", "may include", or the like, indicates an existence of a corresponding feature (for example, a numerical value, a function, an operation, a component such as a part, or the like), and does not exclude an existence of an additional feature.

In the description, the term "at least one of A or/and B" may include all possible combinations of the items that are enumerated together. For example, the term "at least one of A or/and B" means (1) including at least one A, (2) including at least one B, or (3) including both at least one A and at least one B.

Expressions "first", "second", or the like, used in the disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled with/to another component or may be coupled with/to another component through the other component (for example, a third component). On the other hand, when it is mentioned that any component (for example, a first component) is "directly coupled with/to" or "directly connected to" to another component (for example, a second component), it is to be understood that the other component (for example, a third component) is not present between any component and another component.

An expression "configured (or set) to" used in the disclosure may be replaced by an expression "suitable for", "having the capacity to", "designed to", "adapted to", "made to", or "capable of" depending on a situation. A term "configured (or set) to" may not necessarily mean only "specifically designed to" in hardware. Instead, an expression "an apparatus configured to" may mean that the apparatus is "capable of" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

In the disclosure, the term "user" may refer to a person who uses an electronic apparatus or a device using an electronic apparatus (e.g.: an artificial intelligence electronic device).

Hereinafter, the present disclosure will be described in detail with accompanying drawings.

FIG. 1 is a view provided to explain a speech recognition system providing a response to a user's query according to various embodiments.

Referring to FIG. 1, a speech recognition system 1000 may include an electronic apparatus 100 and a user terminal device 200 as illustrated in FIG. 1.

The user terminal device 200 receives a user speech. To do so, the user terminal device 200 may include a microphone. Once the user terminal device 200 receives a user speech through a microphone, it may convert the received user speech into a speech signal and transmit the converted speech signal to the electronic apparatus 100.

Once the electronic apparatus 100 receives the speech signal from the user terminal device 200, the electronic apparatus 100 may perform speech recognition regarding the speech signal and perform an operation according to a speech recognition result.

To do so, the electronic apparatus 100 may include a dialogue system capable of processing a user query and answer to a natural language using an AI model.

The electronic apparatus 100 may obtain a keyword from a user speech using a dialogue system, determine a user's intent based on the obtained keyword and perform an operation corresponding to the user speech.

Specifically, upon receiving a user speech signal including a request related to a device, the electronic apparatus 100 may obtain the first keyword related to the type of the device and the second keyword related to the characteristic of the device. In addition, the electronic apparatus 100 may perform an operation corresponding to the user speech signal using the identification information and specification information of the device.

The identification information of a device in this disclosure may include an intrinsic value to identify a device such as a model name, a product number, etc. of the device.

In addition, the specification information of a device in this disclosure may include one of the device's capability, power, efficiency, service providing area, size, color, the number of some elements constituting the electronic apparatus (e.g., the number of refrigerator doors or the number of fan blades), shape (e.g., stand type, wall mount type, etc.), and manipulation method (button type or touch type).

If a user requests an operation related to a device using the above-described dialogue system, the user may request an operation related to the device without inputting the identification number such as the product number of the electronic apparatus.

Hereinafter, the electronic apparatus 100 will be described in greater detail with reference to FIGS. 2 to 4.

FIG. 2 is a block diagram illustrating configuration of the electronic apparatus 100 according to an embodiment.

As illustrated in FIG. 2, the electronic apparatus 100 includes a memory 110, a communication interface 120 and a processor 130.

The memory 110 is configured to store various programs and data necessary for operation of the electronic apparatus 100. The memory 110 may be implemented as a non-volatile memory, a volatile memory, a flash memory, a hard-disk drive (HDD), a solid state drive (SSD), etc. The memory 110 is accessed by the processor 130, and reading/recording/modifying/deleting/updating of the data can be performed by the processor 130. In this disclosure, the term of memory may include the memory 110, a ROM (not illustrated) in the processor 130, a RAM (not illustrated), or a memory card (not illustrated) (e.g., a micro SD card or a memory stick) mounted on the electronic apparatus 100. In addition, the memory 110 may store programs, data, etc. for configuring various screens to be displayed on a display area of a display.

In addition, the memory 110 may store an AI agent for operating an interactive system. Specifically, the electronic apparatus 100 may use the AI agent to generate natural language in response to a user speech. In this case, the AI agent is a dedicated program for providing AI-based services (e.g., a speech recognition service, a secretary service, a translation service, a search service, etc.). In particular, the AI agent may be executed by a conventional general purpose processor (e.g., CPU) or a separate AI dedicated processor (e.g., GPU, etc.).

The memory 110 may store identification information of a plurality of devices. In addition, the memory 110 may store the use history of a user with respect to a plurality of devices. Here, the use history may represent the use pattern or use history of the user with respect to a plurality of devices.

However, this is only an example, and the memory may further include various information related to a device. For example, a device list may further include specification information of the device.

Further, the memory 110 may include a plurality of elements (or modules) constituting a dialogue system as illustrated in FIG. 3, which will be described in detail with reference to FIG. 3.

FIG. 3 is a block diagram illustrating a dialogue system of an electronic apparatus according to an embodiment. A dialogue system 300 illustrated in FIG. 3 is configured to perform a dialogue with a user through a natural language, and according to an embodiment, the dialogue system 300 may be stored in the memory 110 of the electronic apparatus 100. However, this is only an example, at least one element included in the dialogue system 300 may be included in at least one external server.

As illustrated in FIG. 3, the dialogue system 300 may include automatic speech recognition (ASR) 310, natural language understanding (NLU) 320, dialogue manager (DM) module 330, natural language generator (NLG) module 340, and text to speech (TTS) module 350. The other dialogue system 300 may further include Knowledge Base and Question and Answer Engine.

The ASR module 310 may convert the user voice (particularly, a user query) received from the user terminal 200 into text data. For example, the ASR module 310 may include an utterance recognition module. The utterance recognition module may include an acoustic model and a language model. For instance, the acoustic model may include information related to speech, and the language model may include unit phoneme information and combination of unit phoneme information. The utterance recognition module may convert user utterance into text data using information related to speech and unit phoneme information. The information regarding the acoustic model and the language model, for example, may be stored in automatic speech recognition database (ASR DB) (not shown).

The NLU module 320 may figure out a user intent regarding a user voice by performing syntactic analysis or semantic analysis. According to the syntactic analysis, a user input may be divided in grammatical units (e.g.: a word, a phrase, a morpheme, etc.), and it may be figured out which grammatical element a divided unit has. The semantic analysis may be performed by using semantic matching, rule matching, formula matching, etc. Accordingly, the NLU module 320 may obtain a domain or an intent regarding a user input.

The NLU module 320 may determine the intent and the parameter of the user by using a matching rule divided into the domain and the intent. For example, one domain (e.g., search) may include a plurality of intents (e.g., device search, information search, etc.), and one intent may include a plurality of parameters (e.g., search object, search device, search result providing device, etc.). The matching rule may be stored in the natural language understanding database (NLU DB) (not shown).

The NLU module 320 may identify the meaning of word extracted from the user input by using linguistic features (e.g., syntactic elements) such as morphemes and phrases, and determine the intent of the user by matching the identified meaning of the word with the domain and the intent. For example, the NLU module 320 may determine the intent of the user by calculating how much the word extracted from the user input is included in each domain and intent. According to an embodiment, the NLU module 320 may determine a parameter of the user input by using a word on which the NLU module 320 bases to identify the intent. According to an exemplary embodiment, the NLU module 320 may determine the intent of the user by using the natural language recognition database (not shown) in which the linguistic features for identifying the intent of the user input are stored.

In addition, the NLU module 320 may figure out the subject device, the attribute of the device, the operation of the device, etc. included in the user speech signal using syntactic analysis or semantic analysis.

In this case, the NLU module 320 may identify the subject device based on the title (e.g., air conditioner, TV, etc.) included in the user speech signal, and determine an operation to be performed in the subject device based on the description regarding the above-mentioned title, and determine an operation of the subject device based on the adjective that modifies the above-mentioned title or the adverb that modifies the verb.

For example, if a user speech signal includes "turn on the air conditioner in the dehumidification mode", the NLU module 320 may identify that the subject device is an air conditioner, the property of the device is dehumidification, and the operation of the device is 'turn on.'

The dialogue manager module 330 may determine whether the intent of the user identified by the NLU module 420 is clear. The dialogue manager module 330 may determine whether the parameter identified by the NLU module 320 is sufficient to perform the task. According to an embodiment, when the intent of the user is not clear, the dialogue manager module 330 may perform a feedback for requesting necessary information to the user. For example, the dialogue manager module 330 may perform a feedback for requesting information on a parameter for identifying the intent of the user. In addition, the dialogue manager module 330 may generate and output a message to conform the user's query including the text changed by the NLU module 320.

According to an embodiment, the dialogue manager module 330 may include a content provider module (not shown). When the content provider module may perform an operation based on the intent and the parameter identified by the NLU module 320, the content provider module may generate a result of performing the task corresponding to the user input.

According to another embodiment, the dialogue manager module3430 may provide a response to the user inquiry using a knowledge base 360 and a QA engine 370.

The knowledge base 360 stores an object, a relationship between the objects, and attributes of the objects in a table or graph form, and may include data in which a relationship or an attribute is stored in a plurality of forms.

In this case, the object may be named as class, entity, parameter, etc., and the attributes of the object may include attribute type/attribute name or attribute value.

If the new knowledge information is added, the knowledge base 260 may receive additional information of the new knowledge information from an external server and store the knowledge information and the additional information in the form of knowledge graph. For example, if a user has called an air conditioner having a model name of AF16HVVS1 as a 'large air conditioner', the knowledge base 360 may map the device information of the model name AF16HVVS1 stored in the knowledge base and the information of 'large air conditioner' and store the same in the form of knowledge graph.

In addition, the dialogue manager module 330 may obtain information for a response to a user's query using the QA engine 370. Specifically, the dialogue manager module 330 may obtain response information regarding the user's query from, for example, a web server, hierarchy knowledge base database, etc. using the QA engine 370.

Specifically, the dialogue manager module 330 may identify the type of inference required to obtain information about a parameter using the knowledge base 360 and the QA engine 370. Specifically, the dialogue manager module 330 may determine the type of data or combination of the type of data necessary for obtaining information regarding a parameter based on the knowledge base 360 and the QA engine 370.

For example, if the information regarding a parameter is a model name of a device, the dialogue manager module 330 may search a device having the corresponding model name using the knowledge base 360 and the QA engine 370 and provide a response. In addition, if the information regarding a parameter is '65-inch TV', the dialogue manager module 330 may search a 65-inch TV without special inference and provide a response.

Meanwhile, if the information regarding a parameter is 'a large TV', the dialogue manager module 330 may determine that it is necessary to have the specification information of devices and to compare specification of the devices in order to obtain information regarding 'a large TV.' In addition, if the information regarding a parameter is 'a large TV that was turned on last night', the dialogue manager module 330 may determine that it is necessary to have specification information of devices, compare specification of devices and have use history information in order to obtain the information regarding the 'a large TV that was turned on last night.'

Meanwhile, the dialogue manager module 330 may obtain information regarding the parameter based on the type of the determined inference or the type of data. For example, if the user utters "let me know how to clean the filter of the large air conditioner", as described above, the dialogue manager module 330 may determine that it is necessary to have the specification information of devices and compare the specification information in order to determine 'the large air conditioner' using the knowledge base 360, and may determine which specification (e.g., size information) is necessary from among a plurality of specifications included in the specification information of devices. For instance, the dialogue manager module 330 may obtain information regarding an air conditioner from among devices of a user based on the knowledge base 360 and the QA engine 370, and determine the large air conditioner based on the size information from among the specification information of the air conditioner.

The natural language generator module 340 may change designated information into a text form. The information changed in the text form may be in the form of natural language utterance. The designated information may be, for example, information on an additional input, information for guiding completion of an operation corresponding to the user input, or information (e.g., feedback information for the user input) for guiding the additional input of the user. The information changed into the text form may be displayed on a display device (not shown) or may be changed into a speech form by the text-to-speech module 350.

The text-to-speech module 350 may change information in the text form into information in the speech form. The text-to-speech module 350 may receive the information in the text form from the natural language generator module 340 and change the information in the text form into the information in the speech form to output the information in the speech form to the speaker.

The NLU module 320 and the dialogue manager module 330 may be implemented as one module. For example, the NLU module 320 and the dialogue manager module 330 may be implemented as a single module to determine the user's intent and parameter, and obtain a response corresponding to the determined user's intent and parameter. As another example, the NLU module 320 and the dialogue manager module 330 may convert the first text included in the user query into the second text based on the knowledge base 360, and obtain a response regarding the generated query based on the converted second text.

Meanwhile, referring back to FIG. 2, the communication interface 120 is configured such that the electronic apparatus 100 performs communication with an external electronic apparatus (not shown) including the user terminal device 200. Through the communication interface 120, the electronic apparatus 100 may receive a user speech signal from an external device.

To do so, the communication interface 120 may include various communication modules such as a wired communication module (not shown), a near field wireless communication module (not shown), a wireless communication module (not shown), etc.

Here, the wired communication module is a module to perform communication with an external device (not shown) according to a wired communication method such as a wired Ethernet. The near field wireless communication module is a module to perform communication with an external device (not shown) in a short range according to a near field wireless communication method such as Bluetooth (BT), Bluetooth Low Energy (BLE), ZigBee, etc. The wireless communication module is a module to perform communication with an external device (not shown) and a speech recognition server (not shown) while being connected to an external network according to a wireless communication protocol such as WiFi, IEEE, etc. In addition, the wireless communication module may further include a mobile communication module which is connected to a mobile communication network to perform communication according to various mobile communication standards such as 3rd Generation (3G), 3rd Generation Partnership Project (3GPP), Long Term Evolution (LTE), LTE Advanced (LTE-A), 5G Networks, etc.

Meanwhile, the communication interface 120 may perform communication not only with an external electronic device (not shown) but also a remote control device to control an external electronic device (not shown), that is, a remote controller (not shown).

For example, the communication interface 120 may transmit and receive various data by performing communication with a remote control device (not shown) according to a near field communication method such as Bluetooth or BLE, etc.

Meanwhile, in another example, the electronic apparatus 100 may be connected to an external device (not shown) and include an interface (not shown) to transmit and receive a video/an audio. The interface may transmit/receive a signal/data according to standards such as Display Port (DP), high definition multimedia interface (I-IDMI), consumer electronics control (I-IDMI-CEC), Red Green Blue (RGB) cable, Universal Serial Bus (USB), Digital Visual Interface (DVI), Thunderbolt, Component, etc., and include one or more connector or terminal corresponding to each standard.

The processor 130 may be electrically connected to the memory 110 and control the overall operations and functions of the electronic apparatus 100. For example, the processor 130 may drive an operating system or an application program to control hardware or software components connected to the processor 130, and may perform various data processing and operations. In addition, the processor 130 may load and process instructions or data received from at least one of the other elements into a volatile memory, and store various data in a non-volatile memory.

To do so, the processor 130 may be implemented as a dedicated processor (e.g., an embedded processor) for performing the corresponding operations or as a general purpose processor (e.g., a CPU or an application processor) capable of performing the corresponding operations by executing an one or more software programs stored in a memory device.

When receiving a user speech signal including a request related to a device, the processor 130 may extract the first keyword related to the type of the device and the second keyword related to the characteristic of the device from the user speech signal.

Specifically, the processor 130 may obtain the first keyword related to the type of the device and the second keyword related to the characteristic of the device using the ASR module 310 and the NLU module 320.

For instance, if a user utters, "let me know how to clean the large air conditioner filter", the processor 130 may extract the 'air conditioner' as the first keyword indicating the type of the device and extract 'large' as the second keyword indicating the characteristic or property of the device.

The processor 130 may select a device corresponding to the second keyword based on the identification information and the specification information of a plurality of devices corresponding to the first keyword stored in the memory 110.

Specifically, the processor 130 may obtain the specification information of a plurality of devices based on the identification information of a plurality of devices corresponding to the first keyword.

The processor 130 may obtain the identification information of a plurality of devices corresponding to the first keyword using the knowledge base 360 and the QA engine 370 stored in the memory 110.

Meanwhile, the specification information may vary depending on the type of device.

For example, in the case of an air conditioner, the cooling area, the minimum/maximum cooling capacity, the power consumption, the size, the color, the number of fans, the dehumidification function, the shape (wall-mount, stand), etc. may be the specification information of the air conditioner. In addition, in the case of a TV, the size, the resolution, the type of display panel, the shape (wall-mount, stand), etc. may be the specification information of the TV. In the case of an air cleaner, the service providing area, the size, the presence of display, the type of filter, the color, etc. may be the specification information of the air cleaner. Meanwhile, the specification information of the device is not limited thereto, and may vary according to the type of device or various embodiments.

The processor 130 may store specification information corresponding to a device in the memory 110, or may obtain the same from another server (not shown) or an external device (not shown).

The processor 130 may compare the specification information of a plurality of devices corresponding to the first key word, and select a device corresponding to the second device.

The processor 130 may identify the specification information related to the second keyword form among the specification information of a plurality of devices, and select a device corresponding to the second device by comparing the specification information related to the second keyword.

The processor 130 may identify the specification information related to the second keyword from among the specification information of the device using the knowledge base 360. Specifically, the processor 130 may identify the specification information for inferring the second keyword from among the specification information of the device using the knowledge information stored in the knowledge base 360.

For example, in order to select a device corresponding to 'a large air conditioner', the processor 130 may use the knowledge base 360, and may determine that through the knowledge base 360, in order to select a device corresponding to 'a large air conditioner', the size of the air conditioner, the cooling area, the minimum/maximum cooling capacity, etc. from among the specification information of the air conditioner may be the specification information corresponding to the keyword 'large.'

The processor 130 may compare whether the specification information of a plurality of devices is identical, and if the specification information is not identical, may determine a device corresponding to the second keyword with reference to the corresponding specification information.

On the other hand, if the specification information of a plurality of devices is identical, the processor 130 may select a device corresponding to the second keyword based on the use history regarding the plurality of devices.

For example, if the value of the size of the air conditioners is the same from among the specification information of a plurality of air conditioners but there is difference in the cooling area or the minimum/maximum cooling capacity, the processor 130 may compare the cooling area or the minimum/maximum cooling capacity, and determine that the air conditioner having a large value corresponds to 'the large air conditioner' intended by the user.

On the other hand, if the size of the air conditioners, the cooling area or the minimum/maximum cooling capacity are the same among the specification information of the plurality of air conditioners, the processor 130 may select a device corresponding to the second keyword based on the use history of the plurality of devices.

Meanwhile, if the use history of the plurality of devices is also the same, the processor 130 may allow one of the plurality of devices to operate, and select a device corresponding to the second keyword by requesting a user's response regarding the operating device.

Specifically, if the use history of the plurality of devices is the same, the processor 130 may generate a control signal regarding one device and transmit the generated control signal to one device to request a user's response thereof. Subsequently, the processor 130 may select a device corresponding to the second keyword according to the user's response.

In this case, the processor 130 may generate a natural language corresponding to one device according to the user's response, and store the generated natural language in the memory 110.

Meanwhile, the processor 130 may request confirmation of the user regarding the selected device.

To do so, the processor 130 may generate a natural language corresponding to the device selected based on the specification information regarding the selected device, and ask confirmation of the user regarding the selected device by generating a speech signal including the generated natural language.

In order to generate a natural language corresponding to the selected device, the processor 130 may select one of the specification information of the selected device using the knowledge base 360 and the QA engine 370. Specifically, the knowledge base 360 and the QA engine 370 may identify the specification information which has been most frequently used by the user from among the specification information of the selected device using the stored knowledge data, and generate a natural language corresponding to the selected device using the identified specification information. For example, if it is determined that the user uses color information frequently from among the specification information of devices, with respect to the user speech, 'let me know how to clean the large air conditioner filter', the processor 130 may request the user's confirmation regarding the selected device using the query of 'do you mean the while air conditioner?'.

Meanwhile, the processor 130 may perform an operation corresponding to a user speech signal using the identification information of a selected device.

The processor 130 may determine the intent of the user utterance included in the user speech signal using the dialogue system 300, and perform an operation corresponding to the user speech signal.

The user speech signal may include the intent of requesting information related to the selected device or the intent of request control of the selected device, and the processor 130 may figure out the intent of the user included in the user speech signal to provide information regarding the selected device or provide a control signal regarding the selected device.

To do so, the processor 130 may search information regarding the selected device or a control signal regarding the selected device using the identification information of the selected device, and may transmit the same to the user terminal device 200 or another device (not shown).

In particular, when receiving a user speech signal requesting the information related to a device, the processor 130 may determine a display device to display the information related to the device.

The processor 130 may obtain the specification information of a display device based on the identification information of the display device stored in the memory 100. Specifically, the processor 130 may input the identification information of the display device to the knowledge base 360 and the QA engine 370 and obtain the specification information of the display device.

The processor 130 may generate a natural language corresponding to the display device using the specification information of the display device. In this case, the processor 130 may obtain the specification information which can be easily identifiable by a user from among the specification information of the display device using the knowledge base 360, and generate a natural language corresponding to the display device using the obtained specification information. In this case, the processor 130 may user the dialogue system 300 to generate a natural language. In addition, the processor 130 may provide information corresponding to the user request along with the speech signal including the natural language.

For example, if a user utters, 'let me how to clean the filter of the large air conditioner', the processor 130 may select a display device as a device to receive the information corresponding to the user's request, and may determine that the size information from among the specification information of the display device is specification information easily identifiable by the user using the knowledge of the knowledge base 360. Subsequently, the processor 130 may provide the method for cleaning the filter of the air conditioner corresponding to the large air conditioner along with the speech signal of 'I will inform the cleaning method of the large air conditioner in the 75-inch TV' based on the specification information regarding the size.

Meanwhile, when receiving a speech signal including a control command regarding the selected device, the processor 130 may search the control command of the selected device based on the identification information of the selected device and transmit the same to the user terminal device 200 or the selected device (not shown).

For example, if the user utters, 'turn on the blue fan', the processor 130 may select the device of the user using the first keyword (fan) and the second keyword (blue), search on signal of the selected device using the identification information of the selected device and transmit the same to the user device 200 or the blue fan.

Meanwhile, according to an embodiment, the electronic apparatus 100 receives a speech signal from the user terminal device 200, but it is not necessarily limited thereto.

In other words, according to another embodiment of the present disclosure, the electronic apparatus 100 may receive a speech directly from a user, perform speech recognition, and provide information corresponding to the user request.

FIG. 4 is a view provided to explain an electronic apparatus 400 according to another embodiment.

As illustrated in FIG. 4, the electronic apparatus 400 may receive a speech directly from a user. To do so, the electronic apparatus 400 may include a microphone.

Once receiving a user speech, the electronic apparatus 400 may pre-process the user speech and convert the same into a user speech signal.

The electronic apparatus 400 may include the dialogue system 300 in order to perform speech recognition regarding the speech signal, and convert a user speech into a text using an automatic speech recognition module included in a dialogue system, analyze the intent of the user speech using a natural language understanding module, and generate a response regarding the user speech through a natural language generator module. The specific description regarding this has been provided above with respect to FIGS. 2 and 3, so further description will not be provided.

In other words, if a user speech requesting information related to a device is received from the user, the electronic apparatus 400 may obtain the first keyword related to the type of the device and the second keyword related to the characteristic of the device using the dialogue system 300, select a device related to the user's intent based on the first keyword and the second keyword, and provide the user with information corresponding to the user request from among information related to the selected device.

The electronic apparatus 400 may provide the information corresponding to the user request directly to the user, or through another electronic apparatus (e.g., a display device).

Meanwhile, FIG. 4 illustrates that the electronic apparatus 400 is a speaker, but this is only an example. The electronic apparatus 400 may be implemented as various types of electronic apparatuses. For example, the electronic apparatus 400 may be implemented as smartphone, tablet PC, mobile phone, video phone, e-book reader, desktop PC, laptop PC, netbook computer, workstation, server, PDA, portable multimedia player (PMP), MP3 player, camera, wearable device, and the like.

FIG. 5 is a block diagram illustrating configuration of an electronic apparatus 400 according to another embodiment.

As illustrated in FIG. 5, the electronic apparatus 400 may include a memory 410, a communicator 420, a processor 430, an input interface 440, a display 450, a speaker 460, and a sensor 470. Meanwhile, the memory 410, the communicator 420 and the processor 430 of FIG. 5 have already been described above with reference to FIG. 2 and thus, further description will not be provided.

The input interface 440 may receive a user input to control the electronic apparatus 100. In particular, the input interface 440 may receive a user speech requesting information related to a device. As illustrated in FIG. 5, the input interface 440 may include a microphone to receive a user speech, a touch panel to receive a user touch using the user hand, a stylus pen, etc., a button to receive a user manipulation and the like. However, the input interface 440 illustrated in FIG. 5 is an example, and the input interface 440 may be implemented as another input device (e.g., keyboard, mouse, motion input unit, etc.).

The display 450 may display various information under the control of the processor 430. In particular, the display 450 may display information corresponding to a user request. In addition, when a device corresponding to a user request is selected, the display 450 may display a screen requesting the user's confirmation regarding the selected device. The display 450 may be implemented as a touch screen along with a touch panel 413.

The speaker 460 is configured to output various kinds of alarm sounds or voice messages in addition to various audio data on which various processing operations such as decoding, amplification, and noise filtering are performed by an audio processor. In particular, the speaker 460 may output a response to a user's query as a speech message in the form of a natural language. Meanwhile, the element to output an audio may be implemented as a speaker, but this is only an example. The element may be implemented as an output terminal capable of outputting audio data.

The sensor 470 may sense various state information of the electronic apparatus 400. For example, the sensor 470 may include a motion sensor (e.g., a gyro sensor, an acceleration sensor, etc.) that can detect motion information of the electronic device 400, and also, a sensor that can detect location information (e.g., a Global Positioning System (GPS) sensor), a sensor that can detect environment information around the electronic device 400 (e.g., a temperature sensor, a humidity sensor, an air pressure sensor, etc.), and a sensor that can detect user information of the electronic device 400 (e.g., a blood pressure sensor, a blood sugar sensor, a pulse rate sensor, etc.). In addition, the sensor 470 may include an image sensor for photographing the outside of the electronic device 400, etc.

FIGS. 6 to 9 are sequence views provided to explain an electronic apparatus according to various embodiments. The parts of FIGS. 6 to 9 overlapping with FIGS. 2 and 3 will be omitted for convenience of explanation.

FIG. 6 is a sequence view provided to explain an electronic apparatus that generates a query related to a device using specification information of the device according to an embodiment.

A user may request the user terminal device 200 to send information related to a specific device (S610). For example, the user may request the control of a specific device by saying "turn on the air cleaner in the living room."

The user terminal device 200 may convert the received user speech into a speech signal and transmit the same to the electronic apparatus 100 (S602).

The processor 130 of the electronic apparatus 100 may extract the first keyword related to the type of device and the second keyword related to the characteristic of device from the received user speech signal, and select a plurality of devices corresponding to the first keyword from among user devices based on the first keyword.

In addition, the processor 130 may determine specification information related to the second keyword from among a plurality of pieces of selected specification information using the knowledge base 360 and the QA engine 370, compare the determined specification information between the plurality of devices and select a device related to the user request. Specifically, if there is difference between the plurality of devices, a device related to the user request may be selected based on the specification information in which the difference exists.

Accordingly, the processor 130 may compare the specification information of the plurality of devices (S603).

However, even if there is difference between the specification information of the devices selected by the first keyword, there may be a case in which the user's intent is not clear as to which air cleaner the user refers to, such as 'the air conditioner in the living room.'

In this case, a query may be generated using the specification information (S604).

Specifically, the processor 130 may compare the specification information of a plurality of devices corresponding to the first keyword, and determine the specification information which is not identical to each other. Then, based on the determined specification, the processor 130 may generate information to query to the user.

For example, if there is difference in size among specification information of a plurality of devices, the processor 130 may generate a natural language to device each of the plurality of devices into 'a small air cleaner' and 'a medium air cleaner' using a dialogue system, and transmit a query including such natural language information to the user terminal device 200 (S605). For example, the processor 130 may generate a query "there are two air cleaners, a small one and a medium one. Which one are you talking about?" and transmit the same to the user terminal device 200.

The user terminal device 200 may output the received query from the electronic apparatus 100 (S606), receive a response from a user (S607), and transmit the response to the electronic apparatus 100.

The processor 130 may identify a device related to the information requested by the user based on the received user response, and obtain information corresponding to the user request (S609).

The processor 130 may transmit the information corresponding to the user request to the user terminal device 200 (S610).

In this case, if the information corresponding to the user request needs to be provided by the external device 400 (e.g., a display device), not the user terminal device 200, the user terminal device 200 may transmit the information corresponding to the user request to the external device 400.

FIG. 7 is a view provided to explain an electronic apparatus that generates a query related to a device in consideration of the use history of the device according to an embodiment.

The feature of S701 to S703 and S710 to S712 of FIG. 7 overlap with the feature of S601 to S603 and S609 to S610 of FIG. 6 and thus, further description will not be provided.

There may be a case in which although the processor 130 compares the specification information related to the second keyword among the specification information of a plurality of devices selected by the first keyword, the specification information is the same.

As such, if there is no difference between the specification information of a plurality of devices, the processor 130 may determine the use history of the plurality of devices (S704). Here, the use history may represent the use pattern or the use history of the plurality of devices, and the use history may be stored in the memory of the electronic apparatus 100 or may be obtained from an external server (not shown) by the electronic apparatus 100.

If the specification information of a plurality of devices are the same, the processor 130 may select a device corresponding to the second keyword based on the use history regarding the plurality of devices.

Specifically, the processor 130 may generate a query requesting user's confirmation based on the use pattern or the use history regarding the plurality of devices by the user (S705).

If the user queries, "turn on a small air cleaner", and there are a plurality of small air cleaners having the same specification information, the processor 130 may generate a query requesting the user's confirmation using the use pattern or the use history of the user.

If there is an air cleaner used only during the day according to the use pattern of the user, the processor 130 may generate a query, "would you like to use the air cleaner that is mostly used during the day?", using the dialogue system 300. In another example, the processor may generate a query, "would you like to turn on the air cleaner that you used this morning?", using the use history of the user.

The processor 130 may transmit the generated query to the user terminal device 200 (S706), and the user terminal device 200 may receive a response regarding the query from the user and transmit the same to the electronic apparatus 100 (S709).

The processor 130 may select a device corresponding to the second keyword based on the user's response.

Meanwhile, in S703, if the specification information of a plurality of devices is compared and there is no difference in the specification information, the processor 130 may transmit a control signal to one of the plurality of devices and generate a query related to the device which receives the control signal to determine the user's intent.

In this regard, FIG. 8 is a sequence view provided to explain an electronic apparatus which transmits a control signal and generates a query related to a device that receives the control device. The description regarding the feature of FIG. 8 overlapping with FIGS. 6 and 7 will be omitted.

As in FIG. 7, there may be a case in which although the processor 130 compares the specification information related to the second keyword among the specification information of a plurality of devices selected by the first keyword (S803), and there is no difference in specification information.

As such, if there is no difference in the specification information of the plurality of devices, the processor 130 may transmit a control signal to each of the plurality of devices and receive a response from the user.

Specifically, the processor 130 may generate a control signal to operate one of a plurality of devices (S804) and transmit the same to the user terminal device 200 (S805), and the user terminal device 200 may transmit the received control signal to a device corresponding to the control signal (S806). Meanwhile, this is only an example, and the processor 130 may directly transmit a control signal to one device corresponding to the control signal.

When the device corresponding to the control signal operates according to the control signal, the processor 130 generates a query requesting the user's confirmation regarding the device which receives the control signal (S807), and transmit the same to the user terminal device 200 (S808).

Specifically, when the device corresponding to the control signal operates according to the control signal, the processor 130 may generate a query requesting confirmation regarding whether the device which operates according to the control signal is the device that the user intended using the dialogue system 300. For instance, the processor may generate a query, "is the air cleaner turned on now the right one?", using the dialogue system 300 and transmit the same to the user terminal device 200.

The user terminal device 200 may transmit the received query to the user (S809) and receive a response regarding the query from the user (S810). Alternatively, the user terminal device 200 may transmit the received response information to the electronic apparatus (S811).

The processor 130 may determine the meaning of the user response received from the user terminal device 200 using a dialogue system (S812). If the meaning of the user response is positive, the processor 130 may transmit the response information and information corresponding to the user request (S814). Meanwhile, if it is determined that the meaning of the response of the user terminal device 200 regarding the query is negative, the processor 130 may return to the step S804 and generate a control signal to operate another device among the plurality of devices.

Meanwhile, in the case in which the processor 130 identifies a device after a query to the user since there is no difference in the specification, the processor 130 may generate a natural language regarding the identified device.

In this regard, FIG. 9 is a sequence view provided to explain an electronic apparatus which generates a natural language regarding an identified device according to an embodiment.

S901 to S912 of FIG. 9 overlap with S701 to S712 of FIG. 7 and thus, further description will be omitted.

The processor 130 may generate a natural language to identify a device which receives information corresponding to a user request and store the same in the memory 110.

The processor 130 may generate a natural language corresponding to the device 400 which receives information corresponding to a user request using a natural language included in the user query in step S905.

For instance, if the processor 130 queries, "would you like to turn on the air cleaner that is used mostly during the day?", as in S905, the processor 130 may generate the identification information of the device 400 as 'the air cleaner that is used mostly during the day' using 'the air cleaner that is used mostly during the day' included in the query, and store the same in the memory 110.

FIG. 10 is a flowchart provided to explain a controlling method of an electronic apparatus according to an embodiment.

Referring to FIG. 10, the controlling method according to an embodiment may receive a user speech signal including a request related to the device (S1010).

The first keyword related to the type of the device and the second keyword related to the characteristic of the device can be extracted from the user speech signal (S1020). In order to extract the first keyword and the second keyword, a speech recognition function using a dialogue system can be performed.

The specification information of a plurality of devices may be obtained based on the specification information of the plurality of devices corresponding to the first keyword (S1030). By comparing the specification information of the plurality of devices, a device corresponding to the second keyword may be selected (S1040). In this case, the specification information related to the second keyword is determined with respect to the plurality of devices selected by the first keyword, and by comparing the specification information related to the determined second keyword, a device corresponding to the second keyword may be selected.

Lastly, the controlling method according to an embodiment may perform an operation corresponding to a user speech signal using the identification information of the selected device (S1050).

Meanwhile, computer instructions for performing processing operations of the electronic apparatus 100 according to the aforementioned various embodiments of the disclosure may be stored in a non-transitory computer-readable medium. When computer instructions stored in such a non-transitory computer-readable medium are executed by the processor of a specific device, the processing operations at the electronic apparatus 100 according to the aforementioned various embodiments are performed by the specific device.

A non-transitory computer-readable medium refers to a medium that stores data semi-permanently, and is readable by machines, but not a medium that stores data for a short moment such as a register, a cache, and a memory. As specific examples of a non-transitory computer-readable medium, there may be a CD, a DVD, a hard disc, a blue-ray disc, a USB, a memory card, a ROM and the like.

Although the embodiments of the disclosure have been illustrated and described hereinabove, the disclosure is not limited to the specific embodiments described above, but may be variously modified by those skilled in the art to which the disclosure pertains without departing from the scope and spirit of the disclosure as claimed in the claims. These modifications should also be understood to fall within the technical spirit and scope of the disclosure.

The invention claimed is:

1. An electronic apparatus comprising:
a communication interface;
a memory configured to store identification information of a plurality of devices; and
a processor configured to:
based on a user speech signal including a request related to a device being received, extract a first keyword related to a type of the device and a second keyword related to a characteristic of the device from the user speech signal,
obtain specification information of the plurality of devices based on identification information of a plurality of devices corresponding to the first keyword stored in the memory,
compare specification information of the plurality of devices and select a device corresponding to the second keyword, the second keyword including the extracted second keyword and an inference of the extracted second keyword stored in a knowledge base,
perform an operation corresponding to the user speech signal using identification information of the selected device,
generate a natural language corresponding to the selected device based on specification information of the selected device, and
request confirmation of a user regarding the selected device by generating a speech signal including the generated natural language.

2. The electronic apparatus as claimed in claim 1, wherein the processor is further configured to identify specification information related to the second keyword from among the specification information of the plurality of devices and select a device corresponding to the second keyword by comparing specification information related to the second keyword.

3. The electronic apparatus as claimed in claim 1, wherein the processor is further configured to:
based on a user speech signal requesting information related to a device being received, determine a display device to display information related to the device,
obtain specification information of the display device based on identification information of the display device,
generate a natural language corresponding to the display device using specification information of the display device, and
provide information corresponding to a user request along with a speech signal including the generated natural language corresponding to the display device.

4. The electronic apparatus as claimed in claim 1,
wherein the memory is configured to include a use history regarding the plurality of devices, and
wherein the processor is further configured to, based on specification information of a plurality of devices corresponding to the first keyword being identical, select a device corresponding to the second keyword.

5. The electronic apparatus as claimed in claim 4, wherein the processor is further configured to:
based on a use history regarding a plurality of devices corresponding to the first keyword being identical, generate a control signal regarding one device from among the plurality of devices,
transmit the control signal to the one device, and
request a response of a user regarding the one device.

6. The electronic apparatus as claimed in claim 5, wherein the processor is further configured to generate a natural language corresponding to the one device according to a user response regarding the one device, and store the generated natural language corresponding to the one device in the memory.

7. The electronic apparatus as claimed in claim 1, wherein the specification information includes at least one of capacity, efficiency, service providing area, size, color, shape and manipulation method of the electronic apparatus.

8. A speech recognition method of an electronic apparatus, the method comprising:
receiving a user speech signal including a request related to a device;
extracting a first keyword related to a type of the device and a second keyword related to a characteristic of the device from the user speech signal;
obtaining specification information of a plurality of devices based on identification information of a plurality of devices corresponding to the first keyword;
comparing specification information of the plurality of devices and selecting a device corresponding to the second keyword, the second keyword including the extracted second keyword and an inference of the extracted second keyword stored in a knowledge base;
performing an operation corresponding to the user speech signal using identification information of the selected device,
generating a natural language corresponding to the selected device based on specification information of the selected device; and
requesting confirmation of a user regarding the selected device by generating a speech signal including the generated natural language.

9. The method as claimed in claim 8, wherein the selecting of the device corresponding to the second keyword comprises:
identifying specification information related to the second keyword from among the specification information of the plurality of devices; and
selecting a device corresponding to the second keyword by comparing specification information related to the second keyword.

10. The method as claimed in claim 8, the method further comprising:

based on a user speech signal requesting information related to a device being received, determining a display device to display information related to the device;

obtaining specification information of the display device based on identification information of the display device;

generating a natural language corresponding to the display device using specification information of the display device; and providing information corresponding to a user request along with a speech signal including the generated natural language corresponding to the display device.

11. The method as claimed in claim 8, the method further comprising:

based on specification information of a plurality of devices corresponding to the first keyword being identical, selecting a device corresponding to the second keyword.

12. The method as claimed in claim 11, the method further comprising:

based on a use history regarding a plurality of devices corresponding to the first keyword being identical, generating a control signal regarding one device from among the plurality of devices;

transmitting the control signal to the one device; and requesting a response of a user regarding the one device.

13. The method as claimed in claim 12, the method further comprising:

generating a natural language corresponding to the one device according to a user response regarding the one device; and storing the generated natural language corresponding to the one device in a memory.

* * * * *